United States Patent [19]

Lehmann et al.

[11] 4,250,298
[45] Feb. 10, 1981

[54] POLYAMINES CONTAINING AMIDE GROUPS

[75] Inventors: Wolfgang Lehmann, Leverkusen; Friedhelm Müller, Odenthal; Wilfried Löbach, Bonn; Günther Cramm; Knut Hammerström, both of Cologne, all of Fed. Rep. of Germany

[73] Assignee: Bayer Aktiengesellschaft, Leverkusen, Fed. Rep. of Germany

[21] Appl. No.: 969,820

[22] Filed: Dec. 15, 1978

[30] Foreign Application Priority Data

Dec. 17, 1977 [DE] Fed. Rep. of Germany ....... 2756469

[51] Int. Cl.³ .................... C08G 69/48; C08G 69/26
[52] U.S. Cl. ................. 528/342; 260/29.2 N; 162/164 R; 162/164 EP; 525/420; 528/310; 528/321; 528/326; 528/324; 528/337; 528/422
[58] Field of Search ............... 528/342, 310, 528/422, 324; 525/420, 419

[56] References Cited

U.S. PATENT DOCUMENTS

| | | | |
|---|---|---|---|
| 2,926,154 | 2/1960 | Keim | 528/334 |
| 3,227,615 | 1/1966 | Korden | 528/334 |
| 3,306,875 | 2/1967 | Hay | 528/215 |
| 3,320,215 | 5/1967 | Conte et al. | 528/334 |
| 3,329,657 | 7/1967 | Strazdins et al. | 528/334 |
| 3,642,572 | 2/1972 | Endres et al. | 528/334 |
| 3,887,510 | 6/1975 | Chan et al. | 528/334 |
| 3,893,885 | 7/1975 | Ziemann et al. | 162/164 R |

FOREIGN PATENT DOCUMENTS

1035296 7/1966 United Kingdom .................... 220/285
1147984 4/1969 United Kingdom .......................... 37/6

*Primary Examiner*—Harold D. Anderson
*Attorney, Agent, or Firm*—Sprung, Felfe, Horn, Lynch & Kramer

[57] ABSTRACT

Water-soluble amines which are not self-crosslinking and are obtainable by reacting (A) one or more water-soluble or water-dispersable amines containing amide groups, prepared by condensation of (a) 1 mol of dicarboxylic acid or functional derivatives thereof, (b) 0 to 30 mols of aminocarboxylic acids containing at least three C atoms, or lactams thereof, and (c) 1.4 to 30 mols of polyalkylenepolyamines of the general formula

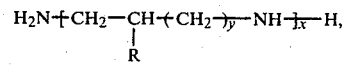

in which
R denotes H or $CH_3$,
y is in each case the same or different and denotes the number 0 or 1 and
x denotes a number from 4 to 15, and (B) compounds which are polyfunctional towards amino groups, are suitable as agents for increasing the retention of fibres, fillers and pigments, for accelerating drainage during the production of paper and for working up effluents from paper machines.

17 Claims, No Drawings

POLYAMINES CONTAINING AMIDE GROUPS

The invention relates to water-soluble polyamines which are not self-crosslinking and are obtainable by reacting (A) one or more water-soluble or water-dispersable amines containing amide groups, prepared by condensation of (a) 1 mol of dicarboxylic acid or functional derivatives thereof, (b) 0 to 30 mols of aminocarboxylic acids containing at least three C atoms, or lactams thereof, and (c) 1.4 to 30 mols of polyalkylenepolyamines of the general formula

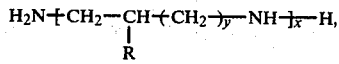

in which
R denotes H or $CH_3$,
y is in each case the same or different and denotes the number 0 or 1 and
x denotes a number from 4 to 15,
or mixtures of these polyalkylenepolyamines with amines of the same general formula, but in which
x denotes a number from 1 to 3,
and
(B) compounds which are polyfunctional towards amino groups.

The invention furthermore relates to a process for the preparation of these water-soluble polyamines and their use as agents for increasing the retention of fibres, fillers and pigments and for accelerating drainage during the production of paper and for working up effluents from paper machines by filtration, sedimentation and flotation.

Possible dicarboxylic acids a on which the polyacidic amines A containing amide groups are based are, in particular, saturated aliphatic dicarboxylic acids, such as succinic acid, glutaric acid, adipic acid, sebacic acid or dodecanedioc acid, or functional derivatives thereof; and furthermore also unsaturated aliphatic dicarboxylic acids, such as maleic acid or fumaric acid, aliphatic etherdicarboxylic acids, such as, for example, diglycolic acid, and aromatic dicarboxylic acids, such as isophthalic acid or terephthalic acid, or functional derivatives thereof, and also mixtures of these dicarboxylic acids.

Examples which may be mentioned of aminocarboxylic acids, or lactams thereof, b on which the amines A containing amide groups are based are: 3-amino-3,3-dimethylpropionic acid, 4-amino-butanoic acid, 6-amino-hexanoic acid, 8-amino-octanoic acid, 11-aminoundecanoic acid and 12-amino-dodecanoic acid, and 3,3-dimethyl-azitidin-2-one, pyrrolid-2-one, 6-caprolactam, 8-capryllactam, 11-undecanelactam and 12-dodecanelactam.

Polyakylenepolyamines c which may be mentioned and on which the amines A containing amide groups are based are, above all, polyethylenepolyamines, such as, for example, ethylenediamine, propylene-1,2-diamine, diethylenetriamine, dipropylenetriamine, triethylenetetramine, tripropylenetetramine, tetraethylenepentamine, tetrapropylenepentamine, pentaethylenehexamine, pentapropylenehexamine, hexaethyleneheptamine, hexapropyleneheptamine, heptaethyleneoctamine, heptapropyleneoctamine, and mixtures thereof, and polyethylenepolyamines which additionally also contain one or more piperazine rings, such as aminoethylpiperazine, pentaethylenepentamine and octaethyleneheptamine, and mixtures thereof, but in particular 1. the polyethylenepolyamine mixture which is obtained from the discontinuous (for example Houben-Weyl, 4th edition, XI/1, page 44) or from the continuous (for example in British Pat. No. 1,147,984 and U.S. Pat. Nos. 1,832,534 and 2,049,467) reaction of 1,2-dichloroethane with aqueous ammonia, optionally in the presence of added ethylenediamine or diethylenetriamine (U.S. Pat. No. 2,769,841 and DE-OS (German Published Specification) No. 1,668,922) and which contains considerable proportions of tetraethylenepentamine, pentaethylenehexamine, hexaethylenehexamine, hexaethyleneheptamine, heptaethyleneheptamine and higher amines, and above all 2. the polyethylenepolyamine mixture which remains after distilling off ethylenediamine, and if necessary also diethylenetriamine and triethylenetetramine, from the mixture of bases prepared according to (1).

3. the oligomeric polyethylenepolyamines obtainable by polymerisation of 1,2-alkyleneimines.

Further polyalkylenepolyamines of the abovementioned formula which may also be mentioned are 4. pure polypropylenepolyamines and mixtures thereof and 5. mixed polyethylenepolypropylenepolyamines and mixtures thereof, above all which are obtained by reacting ethylenediamine and propylene-1,3-diamine with acrylonitrile once or several times, with subsequent hydrogenation in each case, for example the polyacidic amines of the formula

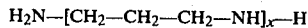

wherein
x denotes an integer from 1 to 10,
and those of the formula

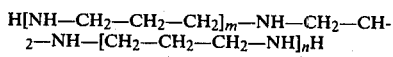

wherein
m denotes an integer from 1 to 5 and
n denotes an integer from 0 to 5

In some cases it is advantageous if a proportion of the polyalkylenepolyamines c employed is replaced by other types of diamines, triamines, tetramines, pentamines or hexamines, for example by amines of the formula

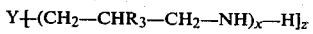

in which
Y represents oxygen, sulphur or the radical of an at least difunctional aliphatic, cycloaliphatic, araliphatic or aromatic compound containing hydroxyl groups and/or sulphydryl groups,
$R_3$ denotes hydrogen or the methyl group,
x is an integer of at least 1, preferably 1–3, and
z represents an integer of at least 2, preferably 2–4.

Examples of representatives of these polyamines are bis-[3-aminopropyl] ether, bis-[3-aminopropyl] sulphide, ethylene glycol bis-[3-amino-propyl] ether, dithioethylene glycol bis-[3-aminopropyl] ether, neopentylene glycol bis-[3-amino-propyl] ether, hexahydro-p-xylylene glycol bis-[3-aminopropyl] ether and hydroquinone bis-[3-aminopropyl] ether as well as amines of the formula

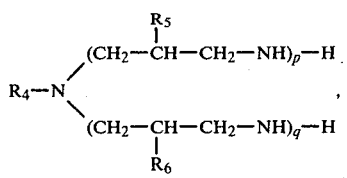

in which

R$_4$ represents a C$_1$–C$_{18}$-alkyl radical which is optionally substituted by an amino or hydroxyl group, R$_5$ and R$_6$ independently of one another represent hydrogen or a methyl group and p+q is a number from 1 to 20, preferably 2 to 5.

Examples of representatives of these polyamines are ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and, above all, methyl-bis-(3-amino-propyl)-amine.

The polyacidic amines A can be prepared from components a, b and c by heating the components at temperatures of 150° to 250° C. under normal pressure for several hours with the exclusion of oxygen, the water liberated during the formation of the amide groups being distilled off. In order to prevent the amines containing amide groups from darkening in colour, it can be advantageous, in some cases, to add small amounts of hydrazine hydrate or hydrazides.

The "polyacidic amines A containing amide groups" which can be used for the preparation of the polyamines according to the invention differ from the known "polyamide-amines" or "polyamidoamines" or "polyamide-polyamines" or "polyamide-polyamides" listed, which are described, for example, in German Pat. Nos. 1,177,824 and 1,771,814 as starting compounds for the reaction with polyfunctional compounds, in that they are formed from components (a) and (c) in a different molar ratio. Whilst the "polyamide-amines" are prepared in the ratio a:c = 1:0.8 to 1.4, preferably 1:1 to 1.1, the polyacidic amines are formed in the ratio 1:1.4 to 3.0, preferably 1:1.75 to 2.5. This relatively large excess of amine prevents relatively high average molecular weights being obtained, which also manifests itself in a lower viscosity of the anhydrous polyacidic amines compared with the "polyamide-amines". Whilst the "polyamide-amines" have a viscosity of 500 to 50,000 mPas (milli-pascals per second) at 150° C., above all from 1,000 to 30,000 mPas, the polyacidic amines on which this invention is based have a viscosity which is less than 500 mPas, in particular less than 250, but above all less than 150, mPas, at 150° C.

If (b) is also used, more than 3 mols of (c) can be employed per mol of (a).

Modified basic polyamides of the abovementioned types are also possible, in particular those in which some of the secondary amino groups have been converted into tertiary amino groups by condensation or addition, for example by reaction with α,β-unsaturated acids in an aqueous medium, such as vinylsulphonic acid, acrylic or methacrylic acid, maleic acid and itaconic acid, or with α,β-unsaturated acid amides, such as acrylamide or methacrylamide, or 1- or 2-halogenofatty acids, such as chloroacetic acid and 2-propionic acid.

Compounds (B) which are polyfunctional towards amino groups and are suitable for the preparation of the polyamines according to the invention are, in particular, those polyfunctional compounds which, in aqueous solution at pH values above 6, preferably above 8, are able to react completely with the amino groups contained in the basic polyamides.

Examples which may be mentioned of compounds which are polyfunctional towards amino groups are: bifunctional compounds, above all α,ω-alkyl dihalides, for example, in particular, 1,2-dichloroethane, 1,2-dibromoethane, 1,2-dichloropropane, 1,3-dichloropropane and 1,6-dichlorohexane; ω,ω'-dihalogeno-ethers, for example 2,2'-dichlorodiethyl ether, bis-(β-chloroisopropyl) ether and bis-(4-chloro-butyl) ether; halogenohydrins and epihalogenohydrins, for example epichlorohydrin, 1,3-dichloropropan-2-ol, bis-(3-chloro-2-hydroxypropyl) ether and 1,4-dichloro-2,3-epoxybutane; bis-epoxy compounds, for example 1,2,3,4-diepoxybutane, diglycidyl ether, ethane-1,2-bis-glycidyl ether and butane-1,4-bis-glycidyl ether; ω-halogenocarboxylic acid halides, for example chloroacetyl chloride, 2-chloropropionyl chloride, 3-chloropropionyl chloride and 3-bromopropionyl bromide; vinyl compounds, for example divinyl ether, divinyl sulphone and methylene-bis-acrylamide; and furthermore 4-chloromethyl-1,3-dioxolan-2-one and chloroformic acid 2-chloroethyl ester, and also chloroformic acid esters, 3-chloro-2-hydroxypropyl ethers and glycidyl ethers of polyalkylene oxides, for example polyethylene oxides, as well as of reaction products of 1 to 50 mols of alkylene oxides, such as ethylene oxide and/or propylene oxide, with 1 mol of dihydric or polyhydric polyols or other compounds containing at least two active hydrogen atoms; and trifunctional compounds, such as 1,3,5-triacryloyl-hexahydro-s-triazine.

The proportions of the polyfunctional compounds B to the polyacidic amines A containing amide groups are appropriately chosen so that the desired degree of condensation in the water-soluble polyamine is not substantially exceeded. The minimum amounts to be used of compounds which are polyfunctional towards amino groups, in order to obtain reaction products with the desired high molecular weight or solutions thereof with the required viscosity, depend mainly on the molecular weight of the two components and can be easily determined from case to case by preliminary experiments.

0.1–0.5 mol, in particular 0.15–0.3 mol, of the polyfunctional compound B is preferably employed per mol of nitrogen atom in the amines A containing amide groups.

The polyamines according to the invention can be prepared from the amines A, containing amide groups, and the polyfunctional compounds B by processes which are in themselves known, for example by a process in which mixtures of A and B are stirred in aqueous media at pH values above 6 and at temperatures between 0° and 130° C. until a sample of the reaction mixture has, in the form of a 10% strength aqueous solution, a viscosity of at least 10 cP at 25° C. It is frequently advantageous if the polyfunctional compounds are gradually added in portions to the amines A, containing amide groups, in an aqueous medium, under otherwise identical reaction conditions, until the desired viscosity is reached. If the reaction has been carried out using relatively high concentration, the content of reaction products in the reaction solution, which is preferably between 10 and 30 percent by weight, is adjusted to the desired final value by dilution with water. In some cases, after the required viscosity has been reached, it is necessary to adjust the pH value of the reaction solution to pH 6, preferably to 4 to 5, by adding acids, for example hydrochloric acid, sulphuric acid, phosphoric acid or acetic acid, in order to bring the reaction to completion. This applies, above all, in the case where the minimum amount of functional compounds required to obtain the desired degree of condensation in the water-soluble polyamine has been considerably exceeded.

However, it is also possible to carry out the condensation reaction in a closed vessel at temperatures above the boiling point of the compound B which is polyfunctional towards amino groups, preferably between 90° and 130° C. and under a pressure of 5 bars, especially if dihalogenoalkanes are used. In this procedure, it is not usually necessary to stop the reaction by adding acid.

The total concentration of the components in the aqueous reaction mixture should be 10 to 50 percent by weight.

In some cases it is advantageous if a proportion of the polyacidic amines A containing amide groups is replaced by other types of amines, for example by "polyamide-amines", see above, and furthermore by those polyamines, containing amide groups, onto which 1,2-polyalkylene-polyamine side chains have been grafted by reaction with 1,2-alkyleneimines, and such as are described, for example, in German Offenlegungsschrift (German Published Specification) No. 1,802,435, and furthermore amines of the formula

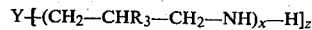

in which
Y represents oxygen, sulphur or the radical of an at least difunctional aliphatic, cycloaliphatic, araliphatic or aromatic compound containing hydroxyl groups and/or sulphydryl groups,
$R_3$ denotes hydrogen or the methyl group,
x is an integer of at least 1, preferably 1–3, and
z represents an integer of at least 2, preferably 2–4.

Examples of representatives of these polyamines are bis-[3-aminopropyl] ether, bis-[3-aminopropyl] sulphide, ethylene glycol bis-[3-amino-propyl] ether, dithioethylene glycol bis-[3-aminopropyl]-ether, neopentylene glycol bis-[3-amino-propyl] ether, hexahydro-p-xylylene glycol bis-[3-aminopropyl] ether and hydroquinone bis-[3-aminopropyl] ether as well as amines of the formula

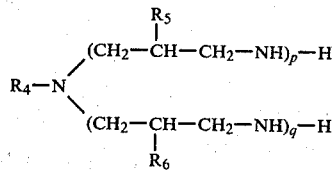

in which
$R_4$ represents a $C_1$–$C_{18}$-alkyl radical which is optionally substituted by an amino or hydroxyl group,
$R_5$ and $R_6$ independently of one another represent hydrogen or a methyl group and
p+q is a number from 1 to 20, preferably 2 to 5.

Examples of representatives of these polyamines are ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and, above all, methyl-bis-(3-amino-propyl)-amine.

The polyamines according to the invention are characterised by a minimum molecular weight of 2,500, preferably 5,000. The upper limit of their molecular weight is imposed by their property of being water-soluble. It is not possible to give a numerical figure for the upper limit of their molecular weight, since this greatly depends on the polyamines on which they are based and the number of groups they contain which confer solubility in water.

When using the polyamines according to the invention as auxiliaries for increasing the retention of fibres, fillers and pigments and as drainage accelerators, the procedure followed is in itself known and is to add the polyamines according to the invention, in the form of dilute aqueous solutions, to the paper-pulp suspension before the head box, the metering point being chosen so that good distribution of the auxiliary in the suspension of the raw materials is ensured but too long a contact time is avoided. The amounts of polyamines which are necessary to produce the desired retention action and/or drainage accelerating action can be determined without difficulty by preliminary experiments; in general, it is advisable to use 0.005 to 0.5 percent by weight of polyamines, relative to the dry weight of the paper. Addition of polyamines according to the invention before the head box of the paper machine also has an advantageous effect on the working up of the effluents from the paper machine by filtration, flotation or sedimentation; the coagulating action of the polyamines according to the invention very considerably facilitates the separation of pulp constituents from the effluent from the paper machine.

When the polyamines according to the invention are used as auxiliaries in the working up of effluents from paper machines by filtration, flotation or sedimentation, the procedure which can be followed is also in itself known and is preferably to add the reaction products concerned, in the form of dilute aqueous solutions, to the effluent from the paper machine, appropriately before entry into the save-all.

The amounts of polyamines which effect adequate coagulation of the paper pulp constituents contained in the effluents from paper machines are to be calculated according to the composition of the effluents and can easily be determined from case to case by preliminary experiments; in general, amounts of 0.005 to 2 g of polyamine per $m^3$ of effluent are adequate for this purpose.

In comparison with the known reaction products prepared from polyfunctional compounds and the most diverse "polyamide-amines", the polyamines according to the invention show, surprisingly, an increase in the retention activity and in the drainage acceleration in the application range of pH 4.0–8.0, the increase being particularly high in a neutral to weakly alkaline medium. The polyamines according to the invention thereby not only almost always achieve the activity of the best products in a neutral or weakly alkaline medium, that is to say the reaction products of polyalkylenepolyamines with bifunctional compounds, but are even many times better than these products.

The polyamines which can be built up from polyacidic amines A, containing amide groups, prepared with mixtures of polyalkylenepolyamines c, above all from the polyethylenepolyamine mixtures described under No. 2 on page 8, in particular with 1,2-dihalogenoalkanes, have proved particularly effective. In many cases the optimum activity is achieved with polyacidic amines, containing amide groups, which are prepared with a molar ratio of dicarboxylic acids, or mixtures thereof, a, to polyalkylenepolyamines, or mixtures thereof, c of 1:1.75-2.5 in the absence, but also in the presence, of up to 1.5 mols of aminocarboxylic acids, or lactams thereof, b. Those polyacidic amines A which are built up mainly from components b and c, with only very small amounts of a, in particular in the molar ratio a:b:c = 1-3:10-20:10-20, also exhibit a very good activity. Many of the polyamines according to the invention have an activity which, in all pH ranges, achieves and, for example, even exceeds the maximum value of the particular product which is the better of the two known products I and II mentioned in the following text.

Some polyamines according to the invention and their use for increasing the retention of fibres, fillers and pigments and for accelerating drainage during the production of paper are described below, by way of example.

PREPARATION EXAMPLES

Preparation of the polyalkylenepolyamines (c)

Polyalkylenepolyamine 1

Excess ammonia is first separated off, under pressure, from the reaction mixture obtained by continuously reacting dichloroethane, aqueous ammonia and ethylenediamine in the molar ratio 1:17:0.4 at 160°-220° C. and under 100 bars, and the bases formed are then liberated from their hydrochlorides at 130°-135° C. with excess 50% strength sodium hydroxide solution. Most of the water and of the ethylenediamine thereby distils off, whilst the higher-boiling bases separate out in the liquid form. The base mixture thus obtained contains, in addition to 15-20% of water and 3-5% of ethylenediamine, about 15-20% of diethylenetriamine, 2-3% of aminoethylpiperazine, ~1% of $NH_2-CH_2CH_2-NHCH_2CH_2-OH$, 15-18% of triethylenetetramine, 3-4% of tetraethylenetetramine, 10-14% of tetraethylenepentamine, 6-10% of pentaethylenehexamine and about 10-15% of higher polyethylenepolyamines and small amounts of sodium chloride and sodium hydroxide.

Polyalkylenepolyamine 2

The residual water, ethylenediamine and most of the diethylenetriamine is distilled off, first under normal pressure and then under reduced pressure of about 100 mbars, from the base mixture obtained according to c/1 and the sodium chloride which separates out is removed by filtration.

Polyalkylenepolyamine 3

In addition to water, ethylenediamine and diethylenetriamine, most of the triethylenetetramine is also separated off by distillation, under a final vacuum of about 10-15 mm Hg, from the base mixture obtained according to c/1 and the inorganic compounds which separate out are likewise removed by filtration, filtration being facilitated by adding kieselguhr, and it also being possible to considerably brighten the amine mixture by using active charcoal.

Polyalkylenepolyamine 4

A mixture of 1 part of ethylenediamine and 1 part of water is reacted continuously with 0.4 part of dichloroethane at 60° to 130° C. and under a pressure of 60 bars. Excess 50% strength sodium hydroxide solution is added to the resulting reaction mixture at 135° C., the water and the unreacted ethylenediamine distilling off. The higher-boiling bases, essentially a mixture of triethylenetetramine, pentaethylenehexamine and heptaethyleneoctamine as well as small amounts of even more highly condensed polyethylenepolyamines, are separated off in the liquid form.

Polyalkylenepolyamine 5

The procedure is as for the preparation of c/4, but with the difference that propylene-1,2-diamine is used instead of ethylenediamine.

Polyalkylenepolyamine 6

The procedure is as for the preparation of c/4, but with the difference that a mixture of $NH_2-CH_2CH_2-CH_2-NHCH_2-CH_2-NH_2 + NH_2CH_2CH_2CH_2-NHCH_2CH_2-NHCH_2CH_2CH_2-NH_2$, which has been obtained by reaction of ethylenediamine with 1.5 mols of acrylonitrile and subsequent hydrogenation, is used instead of ethylenediamine.

Preparation of the polyacidic amines A containing amide groups

Amine 1, containing amide groups 461 g (2.25 mols) of the polyethylenepolyamine given under c/2, with an amine equivalent of 43.7 and an average molecular weight of 205, are initially introduced into a 2 liter three-necked flask. 146 g (1 mol) of adipic acid are then added, whilst stirring, at a rate such that the internal temperature rises to 125° to 135° C. as a result of the heat of neutralisation. The clear melt of the salt is then heated to 195° to 200° C. in the course of 3 hours, whilst passing a slight stream of nitrogen over, and this temperature is maintained for a further 3 hours. The polycondensation reaction is thereby brought to completion, 46.4 g of water (10.4 g more than that calculated for formation purely of the polyamide, which indicates additional formation of imidazoline rings from the polyamide group and adjacent secondary amino group) and 0.6 g of low-boiling polyethylenepolyamines (possibly diethylenetriamine) passing over. The reaction product is then cooled to about 130° to 140° C. and 560 g of water are added rapidly at this temperature. A clear, yellow 50% strength aqueous solution of the polyamide thereby forms.

Viscosity: 88 mPas/50% strength solution/25° C.

Content of basic nitrogen: 11.52%, corresponding to 121.5 g-equivalents

The anhydrous polyacidic amine containing amide groups has a viscosity of 25 mPas at 150° C.

Amine 2, containing amide groups

This amine containing amide groups is prepared, analogously to amine 1, from 359 g (1.75 mols) of polyalkylenepolyamine c/2 and 146 g (1 mol) of adipic acid.

The anhydrous amine containing amide groups has a viscosity of 66 mPas at 150° C.

The resulting 50% strength aqueous solution has the following characteristics:

Viscosity: 119 mPas at 25° C.

Basic nitrogen: 9.99%, corresponding to 140.1 g-equivalents

Amine 3, containing amide groups

This amine containing amide groups is prepared, analogously to amine 1, from 277 g (1.35 mols) of polyalkylenepolyamine c/2 and 146 g (1 mol) of adipic acid. The anhydrous amine has a viscosity of 91 mPas at 150° C. The 50% strength aqueous solution thus prepared has the following characteristics:

Viscosity: 251 mPas at 25° C.
Basic nitrogen: 8.78%, corresponding to 159.4 g-equivalents

Amine 4, containing amide groups

Analogously to amine (1), 359 g (1.75 mols) of the polyalkylenepolyamine indicated under c/2 are reacted with 113 g (1 mol) of ε-caprolactam and 146 g (1 mol) of adipic acid. The mixture is heated to 200° C. in the course of 8 hours and then stirred at this temperature for a further 6 hours. Further working up is carried out as described under Example (1). A total of 65 g of distillate is obtained. The 50% strength aqueous solution of the amine containing amide groups has a viscosity of 170 mPas at 25° C. and an equivalent weight of approximately 155.

Amine 5, containing amide groups

This amine containing amide groups is prepared analogously to amine 1, from 333 g (1.5 mols) of the polyalkylenepolyamine mixture given under c/3, with an amine equivalent of 43.4 and an average molecular weight of 222, and 146 g (1 mol) of adipic acid. The resulting 50% strength aqueous solution has the following characteristics:

Viscosity: 551 mPas at 25° C.
Basic nitrogen: 9.55%, corresponding to 146.6 g-equivalents

Amine 6, containing amide groups

This amine containing amide groups is prepared analogously to amine 5, from 399.5 g (1.8 mols) of the same polyalkylenepolyamine c/3 and 146 g (1 mol) of adipic acid.

The resulting 50% strength aqueous solution has the following characteristics:

Viscosity: 416 mPas at 25° C.
Basic nitrogen: 10.25%, corresponding to 136.6 g-equivalents

Amine 7, containing amide groups

This amine containing amide groups is prepared analogously to amine 5, from 488 g (2.2 mols) of the same polyalkylenepolyamine c/3 and 146 g (1 mol) of adipic acid.

The 50% strength aqueous solution thus prepared has the following characteristics:

Viscosity: 172 mPas at 25° C.
Basic nitrogen: 11.44%, corresponding to 122.4 g-equivalents

Amine 8, containing amide groups

Analogously to amine (1), 444 g (2 mols) of the polyalkylenepolyamine indicated under c/3 are reacted with 452 g (4 mols) of ε-caprolactam and 29 g (0.2 mol) of adipic acid. The mixture is heated to 230° C. in the course of 5 hours and the condensation reaction is carried out at this temperature for a further 15 hours. Further working up is carried out as for amine (1). 25 g of distillate are obtained. The 50% strength aqueous solution of the amine containing amide groups has a viscosity of approximately 110 mPas at 25° C. and an equivalent weight of approximately 189.

Amine 9, containing amide groups

This amine is prepared analogously to the polyacidic amine 1 containing amide groups, from 337 g (1.75 mols) of the polyethylenepolyamine mixture given under c/1, with a water content of 17%, an amine equivalent of 48.6 and an average molecular weight of the pure amine of 160, and 146 g (1 mol) of adipic acid.

The amine containing amide groups has a viscosity of 221 mPas at 150° C.

The resulting 50% strength aqueous solution of the polyacidic amine containing amide groups has the following characteristics:

Viscosity: 123 mPas at 25° C.
Basic nitrogen: 8.75%, corresponding to 160.0 g-equivalents

Amine 10, containing amide groups

This amine is prepared analogously to 9, from 434 g (2.25 mols) of the same polyethylenepolyamine c/1 and 146 g (1 mol) of adipic acid.

The anhydrous amine has a viscosity of 42 mPas at 150° C.

The 50% strength aqueous solution prepared therefrom has the following characteristics:

Viscosity: 141 mPas at 25° C.
Basic nitrogen: 9.94%, corresponding to 140.8 g-equivalents

Amine 11, containing amide groups

This amine is prepared analogously to 9, from 261 g (1.35 mols) of the same polyethylenepolyamine c/1 and 146 g (1 mol) of adipic acid.

The anhydrous amine has a viscosity of 358 mPas at 150° C.

The 50% strength aqueous solution prepared therefrom has the following characteristics:

Viscosity: 557 mPas at 25° C.
Basic nitrogen: 8.07%, corresponding to 173.5 g-equivalents

Amine 12, containing amide groups 274 g (1.42 mols) of the polyalkylenepolyamine mixture given under c/1, with a water content of 17%, an amine equivalent of 48.6 and an average molecular weight of the pure amine of 160, are mixed with 146 g (1 mol) of adipic acid in a reaction vessel with a gas inlet tube and descending condenser, 10 g of adipic acid dihydrazide being added, and the mixture is heated to 190° C. in the course of 4–5 hours, whilst stirring and passing oxygen-free nitrogen over, the reaction temperature in the range from 150°–190° C. being increased at a rate such that the water formed distils off uniformly. After about 73 g of water and small amounts of diethylenetriamine have distilled over, the reaction mixture is further stirred at 190°–180° C. under reduced pressure (20–50 mm Hg) until a total of 130 g of distillate is obtained, and is then cooled to 100° C. and the same amount by weight (288 g) of water is added. The polyacidic amine, containing amide groups, which is formed is thus obtained in the form of a 50% strength aqueous solution which has a viscosity of 276 mPas and a base equivalent of 189.

Amine 13, containing amide groups 582 g (3 mols) of the polyalkylenepolyamine given under c/1, with a water content of 20.6% and an average molecular weight of the pure amine of 154, are mixed with 339 g (3 mols) of δ-caprolactam and 44 g (0.3 mol) of adipic acid in a reaction vessel with a gas inlet tube and descending condenser. The reaction mixture is heated to 200° C. in the course of 3 hours, whilst stirring and passing oxygen-free nitrogen over. It is then stirred at between 200° and 205° C. for 10 hours. It is then allowed to cool and is distilled at 165°–175° C. in vacuo (20–40 mbars) until about 215 g of distillate are obtained. The reaction mixture is cooled to 130° C. and 750 g of water are added. The resulting 50% strength aqueous solution of the amine containing amide groups has a viscosity of 70 to 100 mPas at 25° C. and an equivalent weight of about 180.

Amine 14, containing amide groups

This amine containing amide groups is prepared analogously to 1, from 265 g (1.4 mols) of tetraethylenepentamine and 146 g (1 mol) of adipic acid.

The anhydrous amine has a viscosity of 291 mPas at 150° C.

The 50% strength aqueous solution obtained therefrom has a viscosity of 318 mPas at 25° C. and a base equivalent of 171.1 g.

Amine 15, containing amide groups

This amine containing amide groups is prepared analogously to 1, from 305 g (1.75 mols) of N,N'-bis-(3-aminopropyl)-ethylenediamine and 146 g (1 mol) of adipic acid.

The anhydrous amine has a viscosity of 42 mPas at 150° C.

The 50% strength aqueous solution prepared therefrom has the following characteristics:

Viscosity: 141 mPas at 25° C.

Basic nitrogen: 8.53%, corresponding to 164.1 g-equivalents

Reaction of the polyacidic amines A, containing amide groups, with polyfunctional compounds B to give the "polyamines" according to the invention

Polyamine 1

15.5 g of 1,2-dichloroethane are added to a mixture of 80 g of a 50% strength aqueous solution of the polyacidic amine A/1 containing amide groups and 60 g of water at a temperature of 87°–93° C., whilst stirring very thoroughly, at a rate such that the temperature range can be maintained whilst the mixture simmers, that is to say in the course of two hours for this mixture. The mixture is then further heated at the same temperature until the viscosity has risen to about 30–50 mPas. Therefter, it is cooled to about 75° C. in order to prevent too rapid an increase in the viscosity in the last stage. The condensation reaction is then carried out at this lower temperature until the viscosity has a value such that, after finishing the product, a viscosity of 350–600 mPas/22.5% strength solution/25° C. results. In order to achieve this, the condensation reaction is brought to completion in about the same viscosity range, but at 75° C., and in particular by cooling the mixture, simultaneously adding rapidly a mixture of 15 g of concentrated hydrochloric acid and 20 g of water and by subsequently adding further concentrated hydrochloric acid in an amount such that a pH value of 5.0 is established, for which about a further 11 g are necessary. Whilst cooling, the mixture is then stirred under reduced pressure (50 mm Hg) for a further 1–2 hours in order to completely remove unreacted 1,2-dichloroethane (about 0.5 g). Finally, the mixture is then filled up with a further 195.1 g of water to give a 22.5% strength solution of the reaction product (calculated as the free base, that is to say without the hydrochloride). The reaction time required is about 8 hours.

Viscosity: 350–600 mPas/22.5% strength solution/25° C.

Polyamine 2

This polyamine is prepared analogously to polyamine 1, from 80 g of a 50% strength aqueous solution of the polyacidic amine A/2 containing amide groups and 11.1 g of 1,2-dichloroethane.

The resulting 50% strength aqueous solution has a viscosity of 398 mPas at 25° C.

Polyamine 3

This polyamine is prepared analogously to polyamine 1, from 80 g of a 50% strength aqueous solution of the polyacidic amine A/3 containing amide groups and 7.9 g of 1,2-dichloroethane.

The 50% strength aqueous solution thus obtained has a viscosity of 452 mPas at 25° C.

Polyamine 4

(a) 7.7 g of epichlorohydrin are added dropwise to a mixture of 80 g of a 50% strength aqueous solution of the polyacidic amine A/3 containing amide groups and 60 g of water at 30° C. in the course of 15 minutes, whilst stirring, and the mixture is then warmed to 65°–70° C., whilst stirring. As soon as the solution has a viscosity of about 150–200 mPas at this temperature, which is the case after about 2 to 3 hours, 56.5 g of water are added and the mixture is further stirred at 70° C. until the viscosity of the solution increases no further (about 8 hours).

The resulting 22.5% strength solution of the polyamine has a viscosity of 511 mPas at 25° C.

(b) If 11.4 g of epichlorohydrin are employed instead of 11.1 g of epichlorohydrin, the pH must be adjusted to 4–5 with hydrochloric acid, when the desired viscosity has been reached, in order to obtain a product which is stable on storage.

Polyamine 5

A mixture of 78 g (0.5 equivalent) of a 50% strength aqueous solution of the polyacidic amine A/4, 18 g (0.18 mol) of 1,2-dichloroethane and 40 g of water is warmed to 90° C. in a reaction vessel with a reflux condenser and is stirred at this temperature until a viscosity of 50–60 mPas at 90° C. is reached. The mixture is cooled to 70° C. and the condensation reaction is carried out at this temperature until a viscosity of 250–300 mPas is reached. 20 g of concentrated HCl and 38 g of water are then added and the mixture is cooled. The 22.5% strength solution thus obtained has a pH value of 5 and a viscosity of 300–500 mPas.

Polyamine 6

The polyamine is prepared analogously to polyamine 4, from 80 g of a 50% strength aqueous solution of the polyacidic amine A/7 containing amide groups, 60 g of water and 13.0 g of epichlorohydrin. After adding concentrated hydrochloric acid until the pH value is 4.5 and water until a 22.5% strength aqueous solution of the polyamine is obtained, the product has a viscosity of 318 mPas at 25° C.

Polyamine 7

The polyamine is prepared analogously to polyamine 4, from 80 g of a 50% strength aqueous solution of the polyacidic amine A/6 containing amide groups, 60 g of water and 10.6 g of epichlorohydrin. After adding concentrated hydrochloric acid until the pH value is 4.0 and water until a 22.5% strength aqueous solution of the polyamine is obtained, the product has a viscosity of 306 mPas at 25° C.

Analogous products which have approximately the same activity as retention agents and drainage accelerators are obtained if the polyfunctional substances which follow are employed instead of epichlorohydrin:

Cl-CH$_2$-CH$_2$-NHCO-CH$_2$-Cl,
Cl-CH$_2$-CONH-CH$_2$CH$_2$-NHCO-CH$_2$Cl,
Cl-CH$_2$-CH$_2$-NHCONH-CH$_2$-CH$_2$-Cl

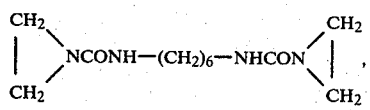

butane-1,4-bis-glycidyl ether and the triglycidyl ether obtained from 1 mol of trimethylolpropane, 10 mols of ethylene oxide and 3 mols of epichlorohydrin.

Polyamine 8

The polyamine is prepared analogously to polyamines 6 and 7, from 80 g of a 50% strength aqueous solution of the polyacidic amine A/5 containing amide groups, 60 g of water and 7.4 g of epichlorohydrin.

The resulting 22.5% strength aqueous solution of the polyamine 8 has a viscosity of 343 mPas at 25° C.

Polyamine 9

This polyamine is prepared analogously to polyamine 1, from 80 g of a 50% strength aqueous solution of the polyacidic amine A/5 containing amide groups and 9.0 g of 1,2-dichloroethane.

The 22.5% strength aqueous solution of the polyamine 9 has a viscosity of 404 mPas at 25° C.

Polyamine 10

3.6 kg of a 50% strength aqueous solution of the polyacidic amine A/1 are warmed to 75° C. in a vessel which can be closed and 1,2-dichloroethane is then added in portions, the vent being closed and whilst stirring well. During this procedure it proves to be advantageous if the dichloroethane is introduced under the surface of the reaction mixture as finely divided as possible, for example by injection. The temperature of the reaction mixture should rise to 115°–120° C. in the course of the reaction.

When a viscosity of 1,000 mPas, calculated for 25° C., has been reached, the addition of 1,2-dichloroethane is stopped-total consumption about 0.68 kg. After a subsequent stirring time of about 30 minutes, the reaction vessel is let down and the reaction mixture is cooled to 60°–70° C. by applying a vacuum of 200–25 mbars. The reaction mixture thus obtained is stable on storage, even without adding acid. When adjusted to 22.5% strength, it has a viscosity of 500 mPas at 25° C. and a pH value of 7.8.

Polyamine 11

95 g (0.5 equivalent) of a 50% strength solution of the polyacidic amine A/8 are warmed to 68°–70° C. with 11 g (0.12 mol) of epichlorohydrin and 50 g of water in a reaction vessel with a reflux condenser. The mixture is stirred at this temperature until a viscosity of 100 mPas is reached. The mixture is then diluted with 30 g of water and stirred at 68°–70° C. until a viscosity of 300–320 mPas is reached. 20 g of concentrated HCl and 34 g of water are then added to the reaction solution and the mixture is cooled. The 25% strength solution thus obtained has a pH value of 5 and a viscosity of between 300 and 500 mPas.

Polyamine 12

This polyamine is prepared analogously to polyamine 1, from 80 g of a 50% strength aqueous solution of the polyacidic amine A/9 containing amide groups and 14.6 g of 1,2-dichloroethane.

The 22.5% strength aqueous solution of the polyamine 12 has a viscosity of 382 mPas at 25° C.

Polyamine 13

A mixture of 100 g of a 50% strength aqueous solution of the polyacidic amine A/12 containing amide groups, 80 g of water and 6.5 g of 1,2-dichloroethane is stirred at 80° to 90° C. in a reaction vessel with a reflux condenser until the viscosity of the reaction mixture has risen to about 480 mPas at 80° C. (after about 7 hours). Thereafter, concentrated hydrochloric acid is added to the solution until the pH is 5.0 and water is added until the polyamine content is 22.5%. The viscosity of the solution has a value of 544 mPas at 25° C.

Polyamine 14

A mixture of 90 g (0.5 equivalent) of a 50% strength aqueous solution of the polyacidic amine A/13 containing amide groups, 50 g of water and 14 g (0.15 mol) of epichlorohydrin is warmed to 68°–70° C. in a reaction vessel with a reflux condenser and is stirred at this temperature until the viscosity of the reaction solution has risen to about 100 mPas. The mixture is then diluted with 40 g of water and the condensation reaction is continued at 68°–70° C. until a viscosity of 350–380 mPas is reached. 30 g of concentrated HCl and 14 g of water are then added to the solution and the mixture is cooled. The 22.5% strength solution thus obtained has a pH value of 4.5 and a viscosity of 500–900 mPas at 25° C.

Polyamine 15

The polyamine is prepared analogously to polyamine 4, from 80 g of a 50% strength aqueous solution of the polyacidic amine A/14 containing amide groups, 60 g of water and 8 g of epichlorohydrin. After adding concentrated hydrochloric acid until the pH value is 3.0–30.9 g are required—and water until a 22.5% strength aqueous solution of the polyamine is obtained, the product has a viscosity of 387 mPas at 25° C.

Polyamine 16

The polyamine is prepared analogously to polyamine 4, from 80 g of a 50% strength aqueous solution of the polyacidic amine A/15 containing amide groups, 60 g of water and 8.8 g of epichlorohydrin. After adding concentrated hydrochloric acid until the pH value is 4.5–30.5 g are required—and water until a 22.5% strength aqueous solution of the polyamine is obtained, the product has a viscosity of 412 mPas at 25° C.

Polyamine 17

The polyamine is prepared analogously to polyamine 4, from a mixture of 40 g of a 50% strength aqueous solution of the polyacidic amine A/14 containing amide groups, 40 g of a 50% strength aqueous solution of the polyacidic amine A/15 containing amine groups, 60 g of water and 8.4 g of epichlorohydrin.

The 22.5% strength aqueous solution has a viscosity of 457 mPas at 25° C.

Polyamine 18

The polyamine is prepared analogously to polyamine 1, from a mixture of 40 g of a 50% strength aqueous solution of the polyacidic amine A/14 containing amide groups, 40 g of a 50% strength aqueous solution of the polyacidic amine A/15 containing amide groups and 8.9 g of 1,2-dichloroethane.

The 22.5% strength aqueous solution has a viscosity of 442 mPas at 25° C.

Example 1

Paper (about 80 g/m$^2$) was produced on a laboratory paper machine (Kämmerer type) from 70% of bleached conifer sulphite pulp and 30% of bleached beech sulphate pulp. The paper was produced on the one hand in the acid range and on the other hand at neutral pH values:

(a) acid range: 30% of China clay, as a filler, 1% of resin size and 3% of aluminium sulphate were added to the paper pulp. The pH value was adjusted to 4.8 with sulphuric acid.

(b) neutral range: 30% of calcium carbonate, as a filler, and 1% of Aquapel 360 XZ (synthetic size based on stearyldiketene, from Messrs. Hercules Inc.) were added to the paper pulp. The pH value was adjusted to 7.8 to 8 with sodium hydroxide solution.

1% strength aqueous solutions of the 22.5% strength polyamines 1 to 18 were metered in, before the head box of the paper machine, by means of a metering pump. For comparison, 1% strength dilutions of the known products which follow were likewise metered in: the "polyamideamines" Ia (=Example 1 of German Patent No. 1,771,814) and Ib (=Example 1 of British Patent No. 1,035,296) known as retention agents; the "polyamideamines" IIa/1 (=Example 1 of U.S. Pat. No. 3,320,215), IIa/2 (=Example 5 of U.S. Pat. No. 3,320,215) and IIb (=Example 1 of U.S. Pat. No. 2,926,154) known as set strength agents; and the polyalkylenepolyamine III (=Example 1 of German Patent No. 2,351,754) known as a retention agent. The solids content in the effluent from the paper machine was determined as a measure of the retention action. The smaller this solids content, the better is the retention action.

Table 1 which follows shows that the polyamines according to the invention have a very good retention action, both in the acid range and in the neutral range, and that this action is better than that obtained when the known "polyamide-amine" retention agents and wet strength agents are employed. As can be seen, in a neutral to weakly alkaline medium, the polyamines according to the invention not only achieve the activity of the polyalkylenepolyamines in most cases, but even considerably exceed these in many cases, whilst in an acid medium the polyamines according to the invention are always better, and in most cases even significantly better, than these polyalkylenepolyamines. The amounts added relate, in each particular case, to the weight of the air-dried pulp and to the 22.5% strength solution of the retention agent.

TABLE 1

| Retention agent | Amount added [%] | Dry residue in the effluent [mg/l] | |
|---|---|---|---|
| | | (a) acid range pH 4.8 | (b) neutral range pH 7.8 |
| none | | 617 | 751 |
| polyamine 1 | 0.1 | 153 | 146 |
| polyamine 2 | " | 156 | 156 |
| polyamine 3 | " | 165 | 185 |
| polyamine 4 | " | 190 | 262 |
| polamine 5 | " | 154 | 151 |
| polyamine 6 | " | 182 | 192 |
| polyamine 7 | " | 184 | 196 |
| polyamine 8 | " | 187 | 198 |
| polyamine 9 | " | 171 | 191 |
| polyamine 10 | " | 152 | 141 |
| polyamine 11 | " | 192 | 276 |
| polyamine 12 | " | 158 | 169 |
| polyamine 13 | " | 163 | 179 |
| polyamine 14 | " | 195 | 289 |
| polyamine 15 | " | 202 | 304 |
| polyamine 16 | " | 181 | 211 |
| polyamine 17 | " | 168 | 191 |
| polyamine 18 | " | 157 | 163 |
| Ia | " | 192 | 376 |
| Ib | " | 203 | 410 |
| IIa/1 | " | 233 | 437 |
| IIa/2 | " | 241 | 443 |
| IIb | " | 254 | 447 |
| III | " | 201 | 195 |

EXAMPLE 2

The freeness was determined by the method of Schopper-Riegler as a measure of the drainage acceleration to be expected on a paper machine used in practice. The more the freeness is reduced by the retention agent added, the better is the drainage acceleration to be expected.

Mixed waste paper was pulped with a high-speed stirrer and the pH value was adjusted:

(a) acid range: 0.5% of aluminium sulphate was added and the pH was adjusted to 4.5 with sulphuric acid.

(b) neutral range: the pH was adjusted to 7.2 with sodium hydroxide solution.

To 200 ml of the 1% strength pulp suspension prepared according to (a) or (b), the 1% strength solution was in each case made up to 1,000 ml with water and the freeness was determined with the aid of the Schopper-Riegler apparatus.

The amounts added relate, in each particular case, to the weight of the air-dried pulp and to the 22.5% strength solution of the polyamines 1 to 18.

Table 2 which follows shows the good drainage effect of the polyamines according to the invention, both in the acid and in the neutral range. For comparison, the known retention agents and wet strength agents indicated in Example 1 were likewise metered in.

TABLE 2

| Drainage accelerator | Amount added [%] | Freeness [°SR] | |
|---|---|---|---|
| | | (a) acid range pH 4.5 | (b) neutral range pH 7.3 |
| none | | 56 | 61 |
| polyamine 1 | 0.4 | 43 | 38 |
| polyamine 2 | " | 44 | 39 |
| polyamine 3 | " | 45 | 41 |
| polyamine 4 | " | 47 | 44 |
| polyamine 5 | " | 44 | 38 |
| polyamine 6 | " | 46 | 42 |
| polyamine 7 | " | 46 | 43 |
| polyamine 8 | " | 47 | 44 |
| polyamine 9 | " | 46 | 42 |
| pplyamine 10 | " | 43 | 37 |
| polyamine 11 | " | 47 | 45 |
| polyamine 12 | " | 45 | 39 |
| polyamine 13 | " | 45 | 40 |
| polyamine 14 | " | 47 | 45 |
| polyamine 15 | " | 48 | 46 |
| polyamine 16 | " | 46 | 42 |
| polamine 17 | " | 46 | 41 |
| polyamine 18 | " | 44 | 39 |
| Ia | " | 47 | 49 |
| Ib | " | 48 | 50 |
| IIa/1 | " | 51 | 53 |
| IIa/2 | " | 51 | 52 |
| IIb | " | 52 | 53 |
| III | " | 50 | 42 |

We claim:

1. A water-soluble polyamine which is not self-crosslinking and which is obtained by reacting
    (A) at least one water-soluble or water-dispersible amine containing an amide group, prepared by condensing (a) a mol of a dicarboxylic acid or amide-forming functional derivative thereof, (b) 0 to 30 mols of an aminocarboxylic acid containing at least three C atoms, or a lactam thereof, and (c) a polyalkylenepolyamine of the formula

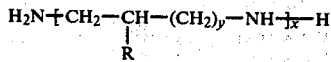

in which
R is H or $CH_3$,
y each independently is 0 or 1, and
x is from 4 to 15,
or a mixture of such a polyalkylenepolyamine with an amine of the same formula but in which x is from 1 to 3,
with the proviso that the molar ratio of a:c is 1:1.75 to 3 in the absence of b and is 3 to 30 in the presence of b, and
(b) a compound which is polyfunctional and reacts with amino groups.

2. A water-soluble polyamine according to claim 1, wherein (c) is a mixture of such polyalkylenepolyamines.

3. A water-soluble polyamine according to claim 1, wherein (c) is a polyethylenepolyamine.

4. A water-soluble polyamine according to claim 1, wherein (c) is a condensation product obtained by reaction of 1 mol of 1,2-dichloroethane with 6 to 30 mols of ammonia and which has been freed from ethylenediamine.

5. A water-soluble polyamine according to claim 1, wherein (c) is a condensation product obtained by reaction of 1 mol of 1,2-dichloroethane with 6 to 30 mols of diethylenetriamine.

6. A water-soluble polyamine according to claim 1, wherein (c) is a condensation product obtained by reaction of 1 mol of 1,2-dichloroethane with 6 to 30 mols of ammonia in the presence of 0.1 to 1 mol of ethylenediamine and which has been freed from ethylenediamine and diethylenetriamine.

7. A water-soluble polyamine according to claim 1, wherein (a) is a saturated dicarboxylic acid containing 4 to 12 carbon atoms.

8. A water-soluble polyamine according to claim 1, wherein A is the condensation product obtained by condensation of (a) 1 mol of dicarboxylic acid with (c) 1.75 to 2.5 mols of polyalkylenepolyamine.

9. A water-soluble polyamine according to claim 1, wherein A in the anhydrous state has a viscosity of less than 500 mPas at 150° C.

10. A water-soluble polyamine according to claim 1, wherein A in the anhydrous state has a viscosity of less than 250 mPas at 150° C.

11. A water-soluble polyamine according to claim 1, wherein A in the anhydrous state has a viscosity of less than 150 mPas at 150° C.

12. A water-soluble polyamine according to claim 1, wherein B is an α,ω-alkylene dihalide.

13. A water-soluble polyamine according to claim 1, wherein B is 1,2-dichloroethane.

14. A water-soluble polyamine according to claim 1, wherein 0.1 to 0.5 mols of B are employed per mol of basic nitrogen in A.

15. A water-soluble polyamine according to claim 1, which in the form of a 10% strength aqueous solution has a viscosity of at least 20 mPas at 25° C.

16. A process for the preparation of a water-soluble polyamine according to claim 1, comprising reacting A and B in an aqueous medium at temperatures from 0° to 120° C., at a total concentration of 10 to 60% and a pH above 6.

17. A process according to claim 16, wherein (c) is employed in an amount such that the minimum amount required to obtain the desired degree of condensation in the water-soluble polyamine is not substantially exceeded.

* * * * *